(12) United States Patent
Warren et al.

(10) Patent No.: US 8,221,187 B2
(45) Date of Patent: *Jul. 17, 2012

(54) MOLDED NON-WOVEN FABRICS AND METHODS OF MOLDING

(75) Inventors: Roger D. Warren, Claremont, NC (US); Robert A. Miller, New Ringgold, PA (US); Asli Begenir, Winston-Salem, NC (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 34 days.

This patent is subject to a terminal disclaimer.

(21) Appl. No.: 12/888,967

(22) Filed: Sep. 23, 2010

(65) Prior Publication Data
US 2011/0068507 A1    Mar. 24, 2011

Related U.S. Application Data

(63) Continuation of application No. 11/267,242, filed on Nov. 4, 2005, now Pat. No. 7,846,005.

(60) Provisional application No. 60/625,491, filed on Nov. 5, 2004, provisional application No. 60/669,604, filed on Apr. 8, 2005.

(51) Int. Cl.
*A41C 3/00* (2006.01)

(52) U.S. Cl. ............... 450/39; 450/93; 450/92; 442/327

(58) Field of Classification Search ............. 450/39, 450/92, 93, 54–58; 442/327, 334, 356–362
See application file for complete search history.

(56) References Cited

U.S. PATENT DOCUMENTS

| | | | |
|---|---|---|---|
| 2,357,392 A | 9/1944 | Francis, Jr. | |
| 3,070,870 A | 1/1963 | Alexander et al. | |
| 3,202,565 A | 8/1965 | Loftin | |
| 3,799,174 A | 3/1974 | Howard | |
| 4,013,750 A | 3/1977 | Magidson et al. | |
| 4,071,914 A | 2/1978 | Silverman | |
| 4,090,900 A | 5/1978 | Jacaruso et al. | |
| 4,125,114 A | 11/1978 | Repke | |
| 4,148,322 A | 4/1979 | Jacaruso et al. | |
| 4,148,985 A | 4/1979 | de Zarauz | |
| 6,715,189 B2 | 4/2004 | Osbon et al. | |
| 7,846,005 B2 * | 12/2010 | Warren et al. | 450/39 |
| 2005/0051923 A1 | 3/2005 | Warren | |
| 2006/0189241 A1 * | 8/2006 | Warren et al. | 442/327 |

* cited by examiner

*Primary Examiner* — Gloria Hale
(74) *Attorney, Agent, or Firm* — Womble Carlyle Sandridge & Rice, PLLC

(57) ABSTRACT

Methods of molding a non-woven fabric are provided. The methods include selecting a non-woven fabric having a web of fibers having a uniform fiber orientation in all directions, compressing the non-woven fabric between a top mold and a bottom mold, and maintaining the non-woven fabric between the top and bottom molds for a predetermined dwell time to define a molded depth and a molded diameter in the non-woven fabric.

14 Claims, 7 Drawing Sheets

MOLDED NON-WOVEN FABRICS AND METHODS OF MOLDING

CROSS REFERENCE TO RELATED APPLICATIONS

This application is a continuation of U.S. patent application Ser. No. 11/267,242, filed Nov. 4, 2005, now U.S. Pat. No. 7,846,005 which claims the benefit of U.S. Provisional Application Ser. No. 60/625,491, filed on Nov. 5, 2004, and U.S. Provisional Application Ser. No. 60/669,604 filed on Apr. 8, 2005, the contents of all of which are incorporated by reference herein.

BACKGROUND OF THE INVENTION

1. Field of the Invention

The present invention is related to non-woven fabric. More particularly, the present invention is related to molded non-woven fabric and methods of molding.

2. Description of Related Art

Non-woven fabrics or textiles (hereinafter "fabric") have been developed for many applications. The ability to mold or shape such non-woven fabrics into a desired shape would vastly expand their utility for many other applications.

Some non-woven fabrics have been successfully molded. For example, non-woven fabrics in the form of a three-dimensional fiber network have been molded. The three-dimensional fiber network is derived from bats of needle punched felts that have been impregnated with binders. The binders in these non-woven bats assist in the molding process to ensure that the fabric, once molded, retains the desired shape. These non-woven bats have a thickness that finds use in many applications such as acoustic insulation, thermal insulation, filter material, and others. Unfortunately, these non-woven bats, once molded, have a hard hand feel. The hard feel and fabric thickness are unacceptable in many applications such as, but not limited to, garment applications, furniture covering applications, and the other soft fabric applications.

Other non-woven fabrics, lacking the above mentioned-binders, have also been successfully shaped. These non-woven fabrics are shaped during the melt-blowing manufacturing process for the raw fabric. During manufacture of the raw fabric, molten thermoplastic materials are extruded through a plurality of fine, usually circular, die capillaries to define a plurality of extruded fibers. The extruded fibers are exposed to a converging high velocity gas stream such as, but not limited to, air that attenuates the extruded fibers to reduce their diameter to a desired dimension. Thereafter, the high velocity gas stream deposits the attenuated fibers on a collecting surface to define a web of randomly disbursed melt-blown fibers. The collecting surface can be shaped to provide non-woven fabrics of any desired shape. Unfortunately, shaped collection surfaces have not proven useful for shaping bulk non-woven fabrics into a variety of different shapes in a time and cost effective manner.

Accordingly, there is a continuing need for molded non-woven fabrics and methods of molding, especially for garment, furniture covering, and other known soft fabric applications.

BRIEF SUMMARY OF THE INVENTION

It is an object of the present invention to provide methods of molding non-woven fabrics.

It is another object of the present invention to provide a molded non-woven fabric or substrate for the creation of a three-dimensional commercial product.

It is still another object of the present invention to provide methods of molding non-woven fabrics with a desired molded shape.

It is yet another object of the present invention to provide molded non-woven fabrics.

It is a further object of the present invention to provide molded non-woven fabrics having a soft hand feel. In some embodiments, the present invention provides molded non-woven fabrics that can maintain their molded shape when crushed and after at least 25 typical laundering cycles.

It is a still further object of the present invention to provide apparel or garments formed of molded non-woven fabric. The garments can be disposable or launderable garments.

A method of molding a non-woven fabric is provided. The method includes selecting a non-woven fabric having a web of randomly disbursed fibers, exposing the non-woven fabric to mechanical agitation, compressing the non-woven fabric between a top mold and a bottom mold, and maintaining the non-woven fabric between the top and bottom molds for a predetermined dwell time to define a molded depth and a molded diameter in the non-woven fabric.

A method of molding a non-woven fabric is also provided that includes selecting a non-woven fabric having a web of randomly disbursed fibers, selecting a top mold and a bottom mold to impart a molded depth and a molded diameter to the non-woven fabric, compressing the non-woven fabric between the top and bottom molds, and maintaining the non-woven fabric between the top and bottom molds for a predetermined dwell time. The top and bottom molds are selected to have a depth that is larger than the molded depth by about 30 to about 50 percent and a diameter that is larger than the molded diameter by less than about 10 percent.

A brassiere is provided that includes at least one layer of non-woven fabric having a web of randomly disbursed fibers and a pair of breast cups molded in the at least one layer.

The above-described and other features and advantages of the present invention will be appreciated and understood by those skilled in the art from the following detailed description, drawings, and appended claims.

DETAILED DESCRIPTION OF THE INVENTION

Figure 1:
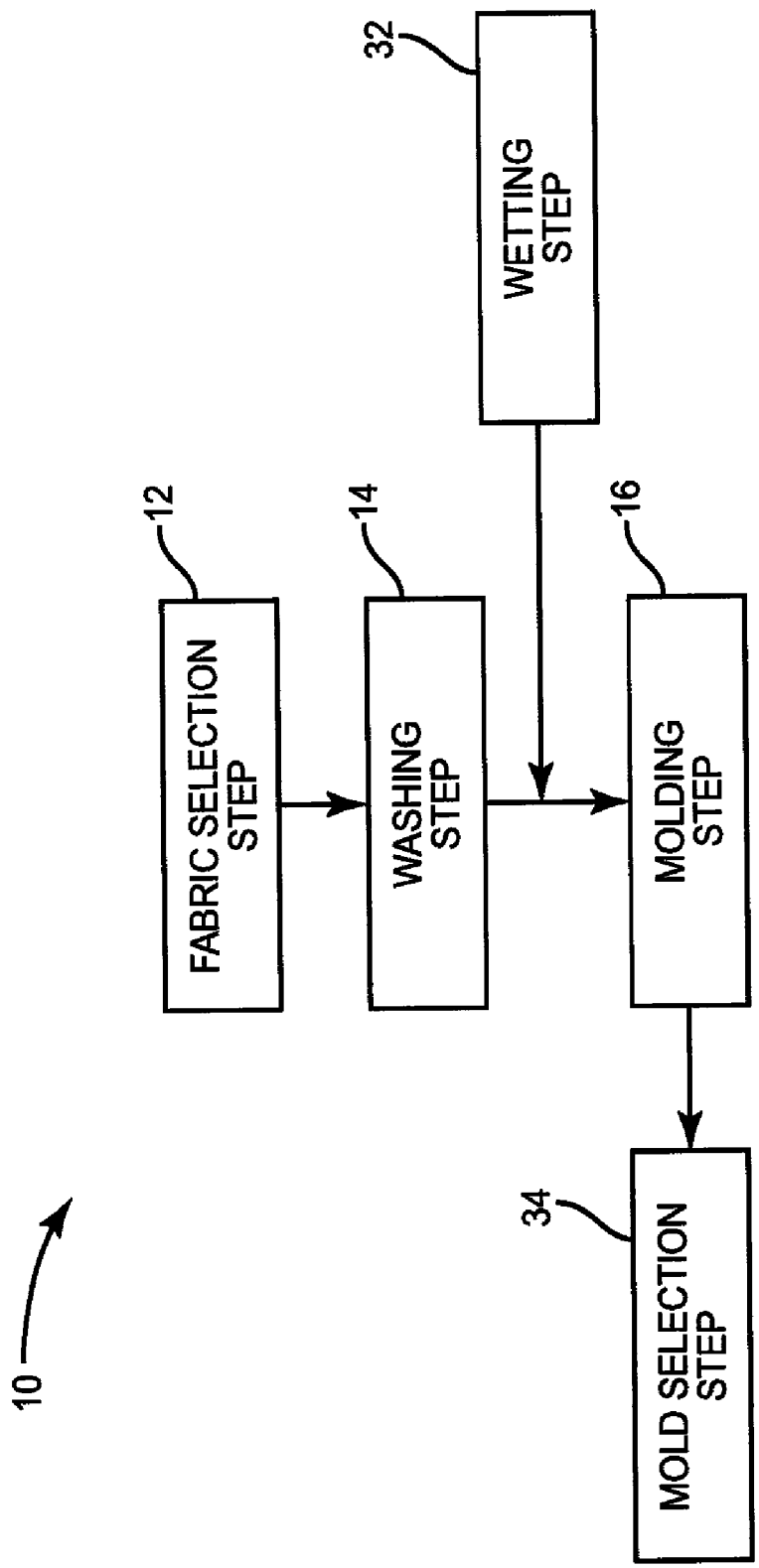
FIG. 1 is a schematic view of an exemplary embodiment of a method of molding a non-woven fabric according to the present invention.

Referring to the drawings and in particular to FIG. 1, a method of molding a non-woven fabric is illustrated generally by reference numeral 10. Advantageously, method 10 can mold non-woven fabrics to a desired shape and feel, including a desired hand feel. The desired hand feel provided by method 10 can range from soft to hard by varying one or more steps of the method.

In a first embodiment of the present invention, method 10 can provide a molded non-woven fabric having a hand feel that is substantially similar to that provided by molded woven fabrics and/or knit fabrics. For example, method 10 can provide molded non-woven fabrics with a hand feel suitable for use in against-the-skin apparel applications such as, but not limited to, brassieres, camisoles, and other soft apparel applications.

Figure 10:
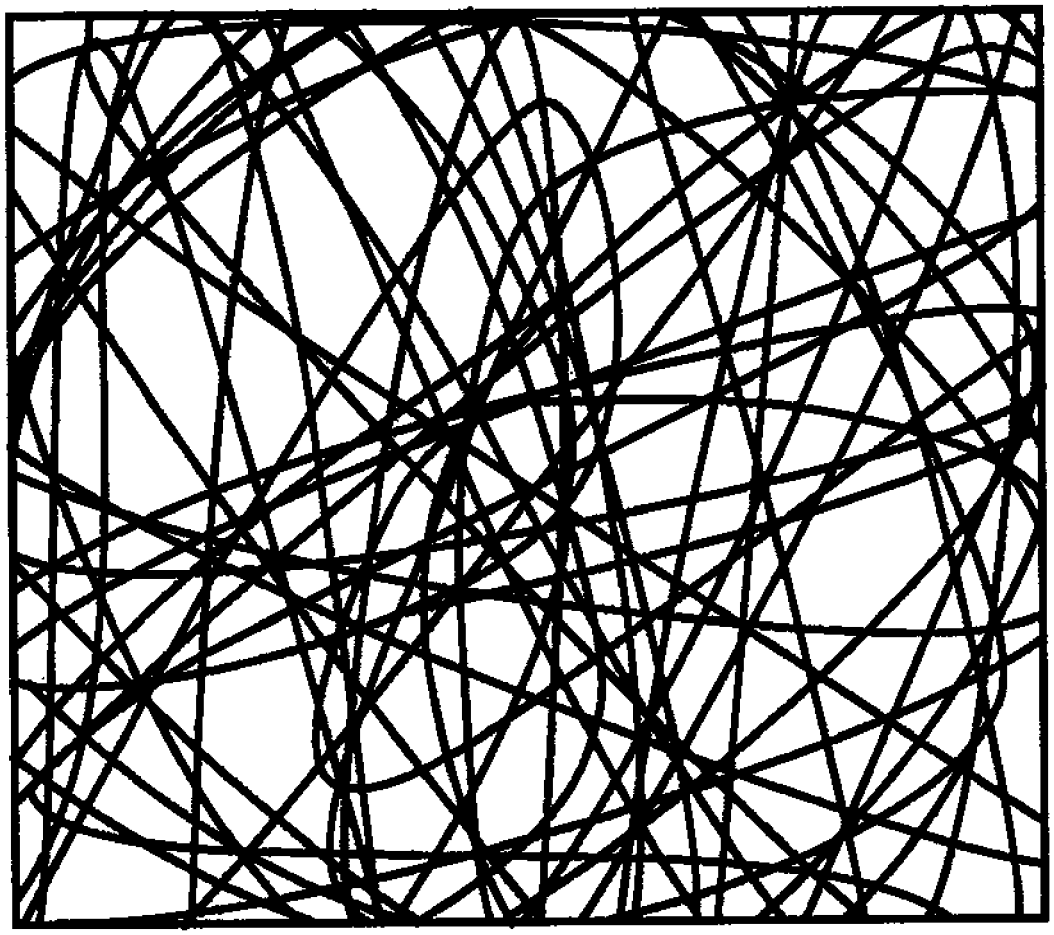
FIG. 10 is an exemplary representation of a uniform fiber orientation of the non-woven fabric.

Method 10 includes a fabric selection step 12, where a desired non-woven fabric is selected. The non-woven fabric selected during step 12 has a web of randomly disbursed fibers or filaments (hereinafter "fibers"), where the web preferably has uniform (fully random) fiber orientation in all directions. An exemplary representation of a uniform, fully random, fiber orientation is shown in FIG. 10. A non-woven fabric that has a uniform fiber orientation has fibers that are not predominantly oriented in any one direction. A non-woven fabric with a uniform fiber orientation has approximately the same number of fibers arranged in all directions in the fabric plane, i.e. machine direction, and cross direction, and intervals therebetween. Such fabrics typically have isotropic properties, e.g. EVOLON, as described below. It is also preferred that the fibers be bonded to and/or entangled with one another. The individual fibers can be monocomponent, multicomponent, or any combinations thereof.

The non-woven fabric selected by selection step 12 can be substantially inelastic or inextensible (hereinafter "rigid") or can be substantially elastic. In a preferred embodiment, the elastic non-woven fabric selected by selection step 12 has at least about 5 percent stretch in one or more directions, preferably two directions, with four directions being most preferred.

In one exemplary embodiment of the present invention that provides hand feel acceptable for soft fabric applications, the non-woven fabric includes a polymer such as, but not limited to, nylon, polypropylene, polyester, and other polymers. In other embodiments of the present invention that provides hand feel acceptable for soft fabric applications, the non-woven fabric includes a polymer and at least some natural fibers such as, but not limited to, cotton or wool.

It is also contemplated by the present invention for non-woven fabrics that provide hand feel acceptable for soft fabric applications to include multicomponent fibers having a blend of polymers such as fibers having a blend of a low-melting temperature polymer and a high-melting temperature polymer. The low-melting temperature polymer allows the non-woven fabric to be molded, while the high-melting temperature polymer introduces structural stability to the fabric.

In yet another exemplary embodiment of the present invention that provides hand feel acceptable for soft fabric applications, the non-woven fabric includes at least two different monocomponent fibers. One of the monocomponent fibers has a low-melting temperature polymer, while another of the monocomponent fibers has a high-melting temperature polymer. Similar to the embodiment above, the low-melting temperature polymer allows the non-woven fabric to be molded, while the high-melting temperature polymer introduces structural stability to the fabric.

It is also contemplated by the present invention for at least a portion of the fibers in the non-woven fabric selected by step 12 to be natural fibers.

The non-woven fabric selected during step 12 can be produced using a non-woven process such as, but not limited to, a melt-blowing process, a spun-bonding process, a hydroentanglement process, a carding process, or any combinations thereof.

The non-woven fabric selected during step 12 for soft hand feel applications can have any desired basis weight. In one embodiment of the present invention, the non-woven fabric has a basis weight of at least about 40 gsm (grams per square meter). In another embodiment of the present invention for soft hand feel applications having drapability sufficient for use in a garment, the non-woven fabric has a basis weight between about 80 to about 900 gsm, more preferably between about 100 to about 200 gsm, and all sub-ranges therebetween.

An exemplary non-woven fabric suitable for selection by fabric selection step 12 for soft fabric applications includes EVOLON®, which is commercially available from Freudenberg Nonwovens of Durham, N.C. EVOLON® is made using a spunbonding and hydroentangling process. The spunbonded fibers are multicomponent fibers having 70% PET and 30% NYLON. During the hydroentanglement portion of the process, the fibers are split into segments. EVOLON® has isotropic properties due to its uniform fiber orientation, an exemplary representation of which is shown in FIG. 10.

After the desired non-woven fabric is selected at selection step 12, the fabric is exposed to a washing step 14. Washing step 14 exposes the desired non-woven fabric to mechanical agitation. Preferably, washing step 14 exposes the desired non-woven fabric to mechanical agitation in the presence of a wetting agent such as, but not limited to, water. More preferably, washing step 14 exposes the desired non-woven fabric to mechanical agitation in the presence of a wetting agent and a detergent.

For example, it is contemplated for washing step 14 to be carried out in a typical household washing machine (processed with or without detergents) or a typical industrial jet-dyeing machine (processed with or without dyes). In this manner, washing step 14 subjects the non-woven fabric to agitation in the presence of water to permit the individual fibers to achieve a desired position with respect to each other as discussed immediately below.

While not wishing to be bound by a particular theory, it is believed that washing step 14 introduces an element of freedom to the individual fibers of the non-woven fabric. It is believed that this freedom allows the fibers to move and/or slide with respect to one another to mitigate tearing of the fabric during subsequent molding steps. For example, it is believed that the agitation of washing step 14 weakens and/or breaks at least some of the bonds and/or entanglements between the individual fibers of the non-woven fabric.

In a preferred embodiment of washing step 14 for soft hand feel applications, the washing step includes the addition of a fabric softener. While not wishing to be bound by a particular theory, it is believed that the addition of the fabric softener provides a degree of lubrication to the individual fibers of the non-woven fabric. It is believed that the lubrication of the individual fibers allows the fibers to slide with respect to one another allowing for deeper molding of the non-woven fabric, while enhancing the hand feel of the resultant molded fabric. An exemplary softener contemplated by the present invention is SANDOPERM SE, which is commercially available from Clariant Corporation of Charlotte, N.C.

After washing step 14, the fabric is exposed to a molding step 16. Molding step 16 is described with reference to FIGS. 2 and 3. For purposes of clarity, molding step 16 is illustrated by way of example as impression molding of a breast cup (e.g., a generally hemispherical shape) for use in a brassiere (e.g., a soft fabric application). However, it is contemplated by the present invention for method 10 to find use in molding non-woven fabrics with shapes other than a hemispherical shape such as, but not limited to, a polygonal shape. Further, it is contemplated for molding step 16 to be other male-female molding processes such as, but not limited to, bubble molding.

Molding step 16 includes the use of a top mold 18 and a bottom mold 20. Top mold 18 includes a mold core 22 in a desired shape. In the example shown, the desired shape is that of a breast cup. Bottom mold 20 includes a mold cavity 24 having a shape complementary to that of core 22. During molding, one or more layers of a non-woven fabric 26 is positioned between the top and bottom molds 18, 20. In the illustrated embodiment, molding step 16 is shown molding a single layer of non-woven fabric 26. However, it is contemplated by the present invention for molding step 16 to simultaneously mold up to four or more layers of non-woven fabric 26. It has been determined by the present invention that the number of layers of non-woven fabric 26 that can be molded increases as the basis weight decreases.

Once non-woven fabric 26 is between top mold 18 and bottom mold 20, the non-woven fabric is compressed. For example, top mold 18 and bottom mold 20 can be moved in a molding direction 28 with respect to one another so that core 22 is received in cavity 24 with non-woven fabric 26 therebetween. Thus, top mold 18 and bottom mold 20 can each move in molding direction 28 towards each other. Preferably, one mold, most preferably, bottom mold 20, is stationary and the other mold, such as top mold 18, moves in molding direction 28.

Figure 2:
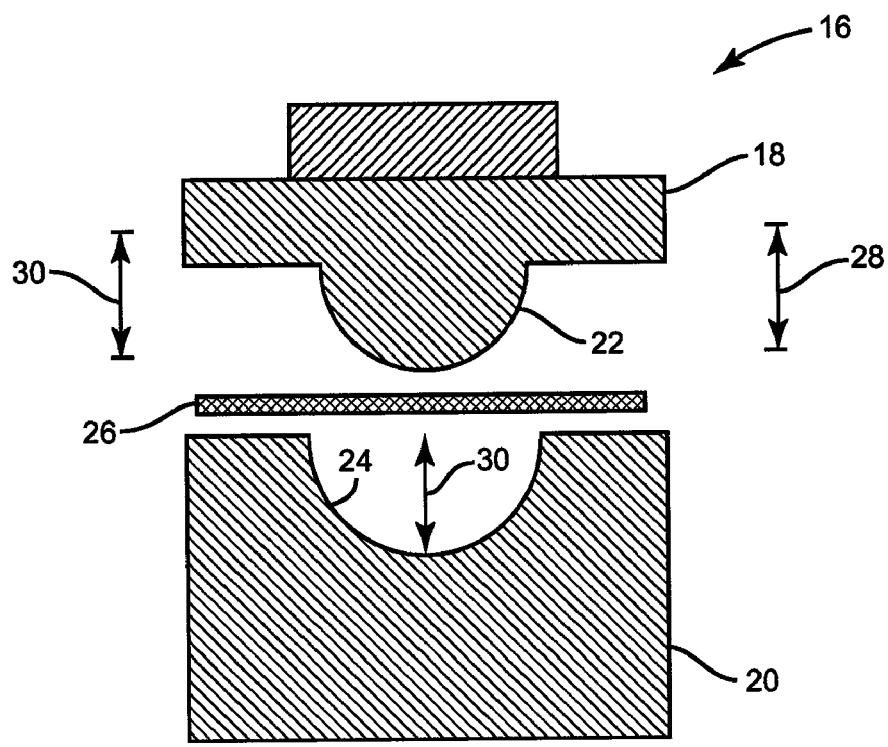
FIG. 2 is a schematic view of a first position of an exemplary molding step according to the present invention.

Molding step 16 is illustrated in FIG. 2 in a first or open position where top and bottom molds 18, 20 have been moved along molding direction 28 so that the molds are remote from one another. Again either mold can move with respect to a stationary mold or both molds can move with respect to one another. The former is preferred.

Figure 3:
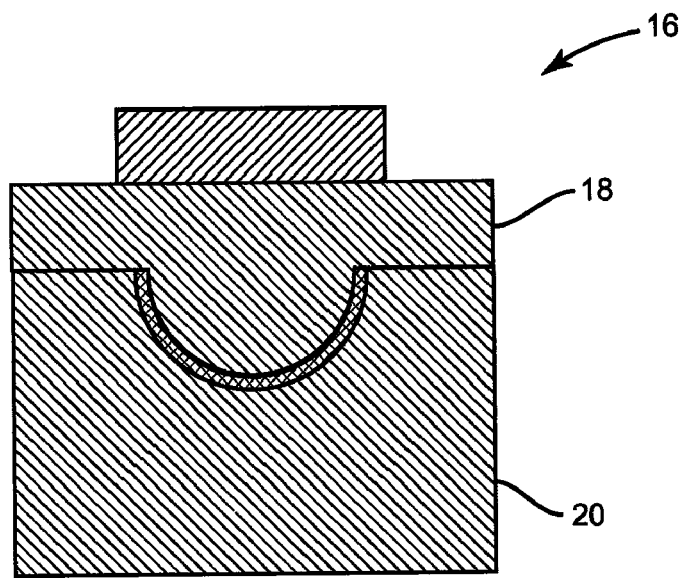
FIG. 3 is a schematic view of a second position of the molding step of FIG. 2.

In the first position, non-woven fabric 26 can be placed between and/or removed from top and bottom molds 18, 20. Molding step 16 is illustrated in FIG. 3 in a second or closed position where top and bottom molds 18, 20 have been moved along molding direction 28 to compress non-woven fabric 26 therebetween. Molding step 16 maintains top and bottom molds 18, 20 in the second position for a predetermined dwell time. As used herein, the term "dwell time" shall mean the time that molding step 16 maintains the non-woven fabric 26 in a compressed state between top mold 18 and bottom mold 20.

In addition to the compressive forces applied to non-woven fabric 26 by top and bottom molds 18, 20, the top and bottom molds can heat the fabric to a predetermined molding temperature. For example, top mold 18 and/or bottom mold 20 can be heated to and maintained at a predetermined temperature during molding step 16.

In other embodiments, top and bottom molds 18, 20 can be cold molds, where fabric 26 can be heated to the predetermined temperature prior to molding step 16 using a bank of heaters, such as radiant heaters. In a preferred embodiment, molding step 16 is a cold molding step, which has been found to provide a more enhanced hand feel to the resultant molded fabric than possible with heated molds.

Since it is desired in this exemplary embodiment for method 10 to provide a non-woven fabric 26 that maintains a soft hand feel after molding, molding step 16 preferably heats the fabric to a temperature (hereinafter "molding temperature") that softens, but does not melt, the low melting point portion of the fibers. Molding step 16 can have a molding temperature of at least about 200 degrees Fahrenheit (F), preferably between about 320 to about 360 degrees F., and all sub-ranges therebetween. Further, molding step 16 can have a dwell time of at least about 5 seconds, preferably between about 8 to about 18 seconds, and all sub-ranges therebetween.

It has been determined that molding step 16 having the aforementioned molding temperature and dwell time provides molded non-woven fabric 26 with the desired soft hand feel. In a preferred embodiment, the desired soft hand feel of molded non-woven fabric 26 is substantially similar to that provided by molded woven fabrics and/or knit fabrics.

It also has been found that method 10 can mold non-woven fabric 26 to a depth of greater than 1 inch without tearing or rupturing the fabric. Preferably, the depth is between about 2 to about 10 inches, and all sub-ranges therebetween. For example, non-woven fabric 26 can be molded to a depth of about 2 inches for the assembly of a brassiere breast cup size B, while the non-woven fabric can be molded to a depth of about 8 inches for the assembly of a brassiere breast cup size G.

Therefore, it is contemplated by the present invention for core 22 and cavity 24 to have a depth 30 of greater than 1 inch, preferably between about 2 to about 10 inches and all sub-ranges therebetween.

Referring back to FIG. 1, method 10 can optionally include a wetting step 32. Wetting step 32 applies a wetting agent such as, but not limited to, water to fabric 26, core 22, and/or cavity 24 prior to molding step 16 so that the fabric is wet when molded. While not wishing to be bound by a particular theory, it is believed that wetting step 32 improves the one or more attributes of the molded fabric such as, but not limited to, the depth, softness, flexibility, or any combinations thereof.

Referring still to FIG. 1, method 10 can optionally include a mold selection step 34. Mold selection step 34 can select the dimensions of cavity 22 and core 24 to be used during molding step 16 to proved a molded article having the desired dimensions.

It is known that the final dimension of many molded materials can be less than the dimension of the cavity and/or core used to mold that shape. During most fabric molding operations, the dimensions of the cavity and core need to be selected to allow for the recovery in fabric from its molded dimensions. In the example of impression molded rigid woven/knit fabrics, the fabric can spring back or recover between about 1/16 to 1/8 inch after molding. This spring back is uniform in all directions. Thus, the cavity and core used for molding rigid woven/knit fabrics have a depth and a diameter that is oversized as compared to the desired dimension by this expected recovery amount. For example, to mold a rigid woven/knit fabric to a breast cup depth of 2 inches and a diameter of 4 inches, the cavity and core are oversized to a depth of about 2⅛ inches and a diameter of about 4⅛ inches.

Interestingly, it has been determined that non-woven fabric 26, once molded by method 10, does not recover evenly in all directions. Advantageously, mold selection step 34 compensates for the uneven recovery exhibited by non-woven fabric 26 molded by method 10.

Mold selection step 34 greatly exaggerates depth 30 of core 22 and cavity 24 as compared to the predetermined depth.

However, mold selection step 34 maintains the diameter of core 22 and cavity 24 substantially similar to the desired diameter. For example, mold selection step 34 provides a breast cup depth of 2 inches and a diameter of 4 inches using core 22 and cavity 24 having a depth of about 2½ inches and a diameter of about 4 inches. Thus, mold selection step 34 provides a cavity and core having a depth that is oversized by about 30 to about 50 percent with respect to the desired molded depth and a diameter that is oversized by less than about 10 percent with respect to the desired molded diameter.

Figure 4:
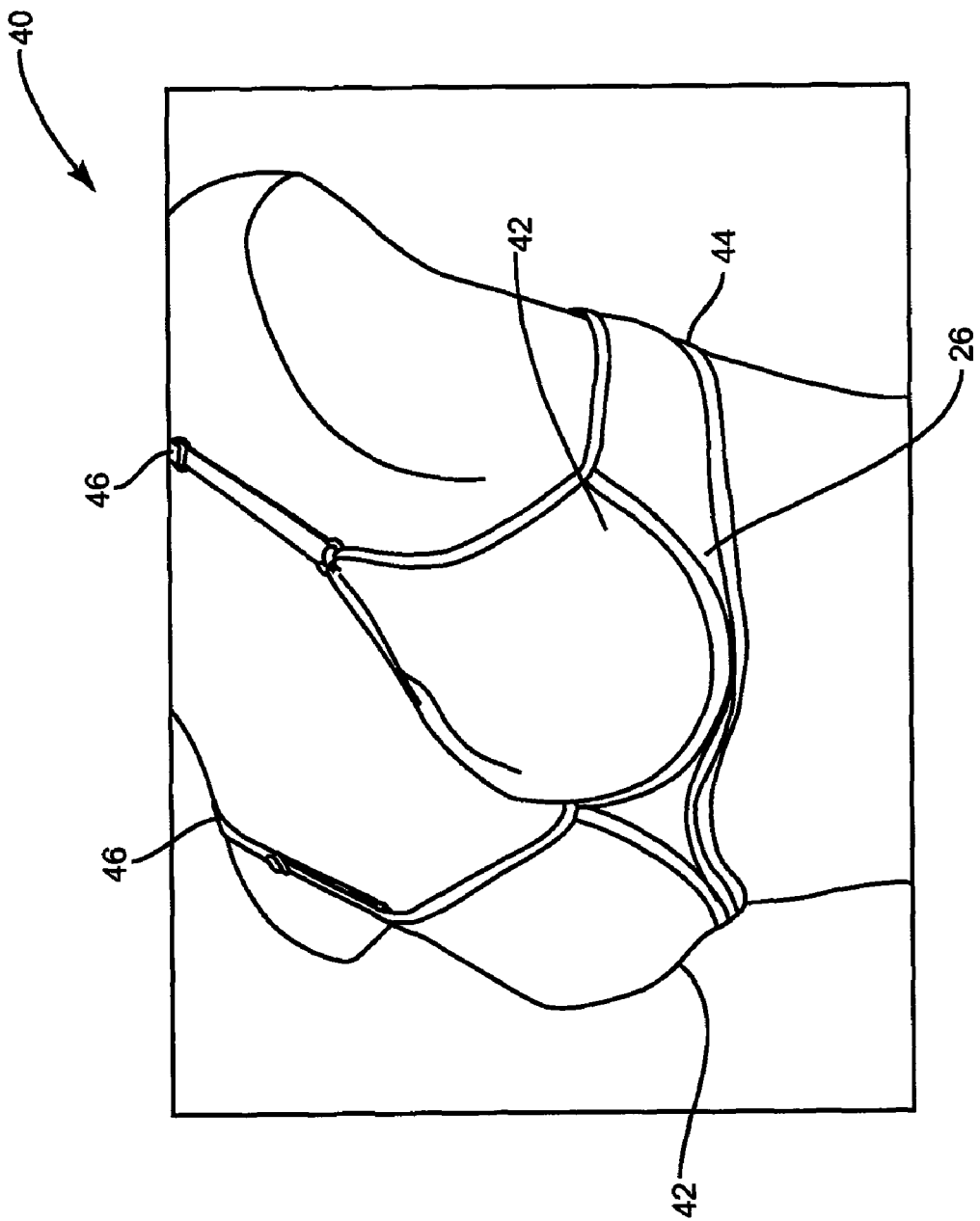
FIG. 4 is a perspective view of an exemplary embodiment of a garment using a molded non-woven fabric.
Figure 5:
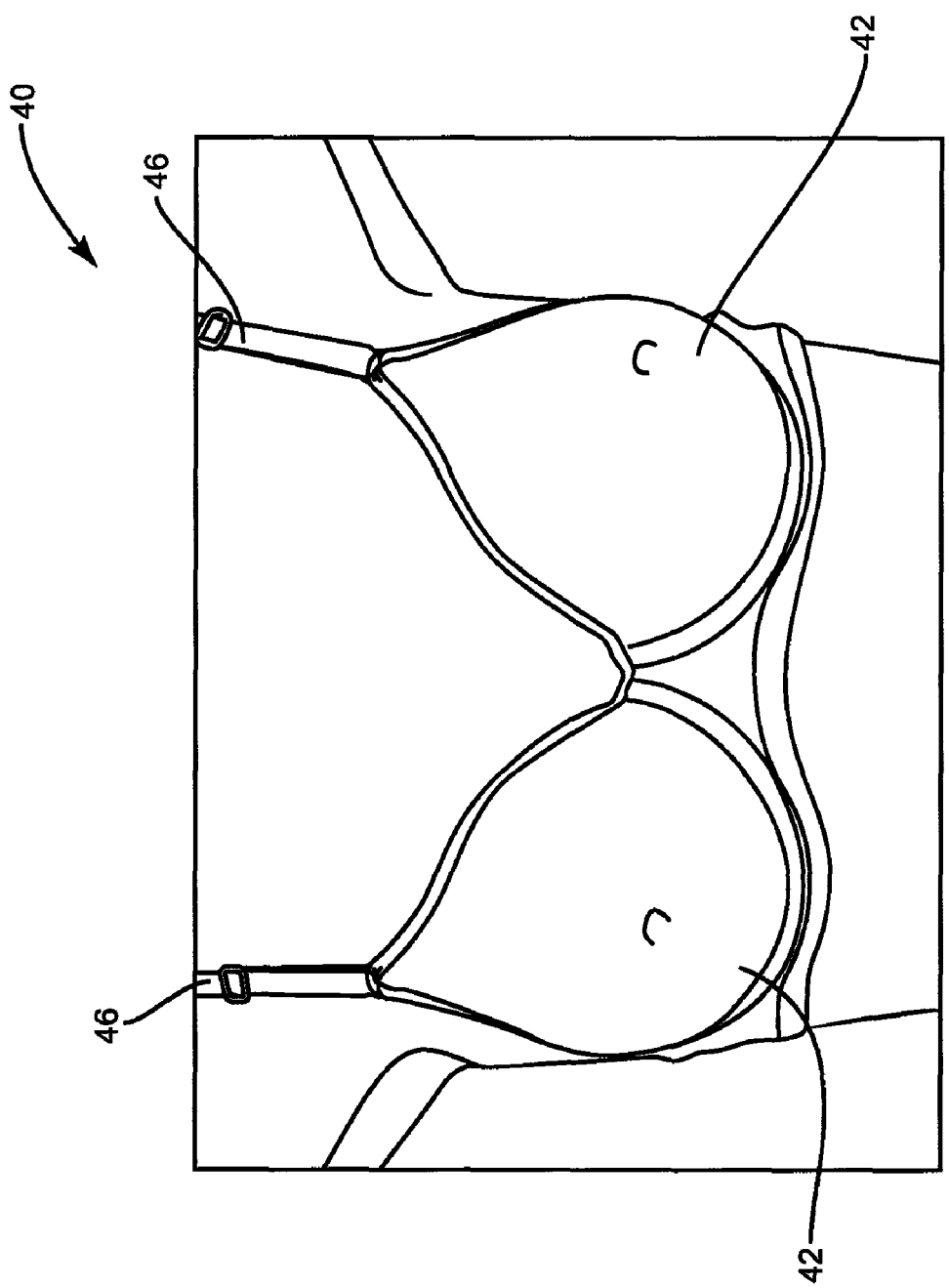
FIG. 5 is a front view of the garment according of FIG. 4.

An exemplary embodiment of a garment, shown as a brassiere 40, including a soft molded non-woven fabric 26 is shown in FIGS. 4 and 5. Brassiere 40 includes a pair of molded breast cups 42 molded from non-woven fabric 26. Molded breast cups 42 are sewn or otherwise secured to a body-encircling region 44 and a pair of shoulder straps 46. In the illustrated embodiment, brassiere 40 is a traditional cut-and-sew garment having breast cups 42, body-encircling region 44, and straps 46 formed from separate pieces of fabric. In this embodiment, it is contemplated that at least molded breast cups 42 are formed from non-woven fabric 26.

As non-woven fabric 26 is made of polymers, it has been determined that securing the separate pieces of brassiere 40 to one another can be achieved using welding techniques such as, but not limited to, ultrasonic welding instead of and/or in addition to sewn seams.

Breast cups 42 can have a cup depth molded by method 10 discussed above to a depth of about ½ inch to about 8 inches. In this manner, brassiere 40 having non-woven fabric 26 can be made with a variety of different sized breast cups 42. These sized breast cups 42 can range from AA to G.

Advantageously, molded breast cups 42 of brassiere 40 maintain their molded shape when crushed, and after at least 25 typical laundering cycles.

It should be recognized that brassiere 40 is illustrated by way of example only in FIGS. 4 and 5 as a cut-and-sew garment having breast cups 42, body-encircling region 44, and straps 46 secured to one another. Of course, it is contemplated by the present invention for breast cups 42 and body-encircling region 44 to be formed from a single piece of non-woven fabric 26.

Figure 6:
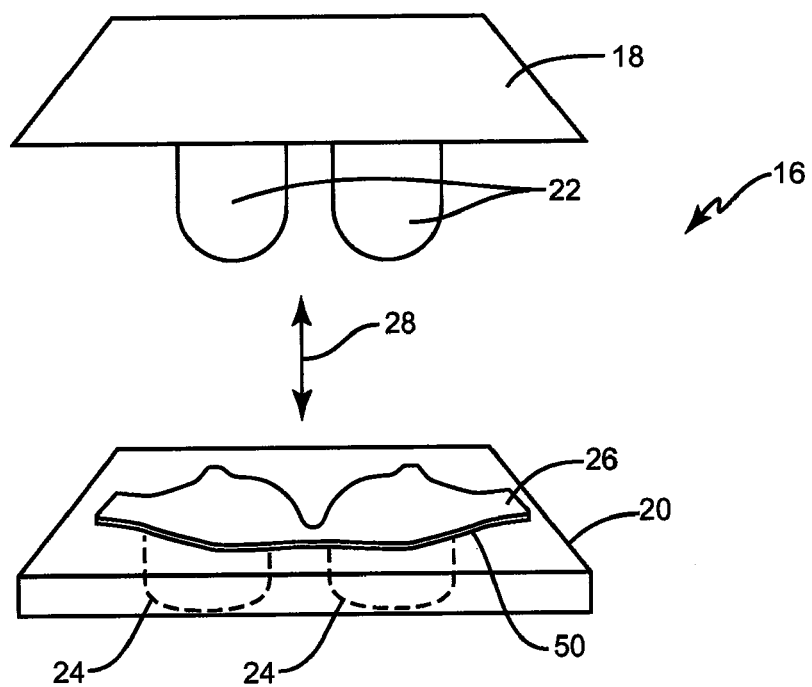
FIG. 6 is a schematic view of an exemplary embodiment of a molding step for making a one piece garment according to the present invention.
Figure 7:
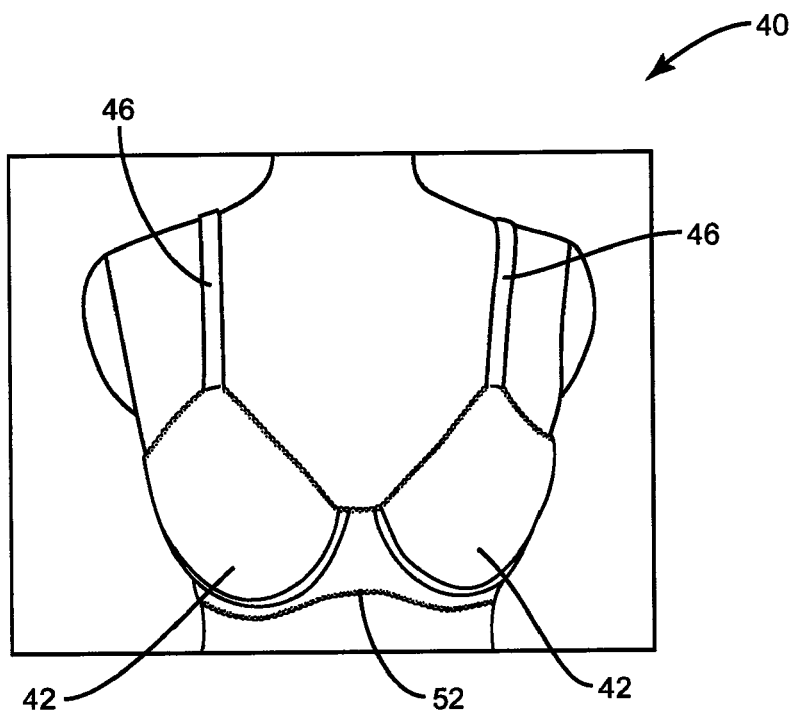
FIG. 7 is a front view of a one piece garment made using the molding step FIG. 6.
Figure 8:
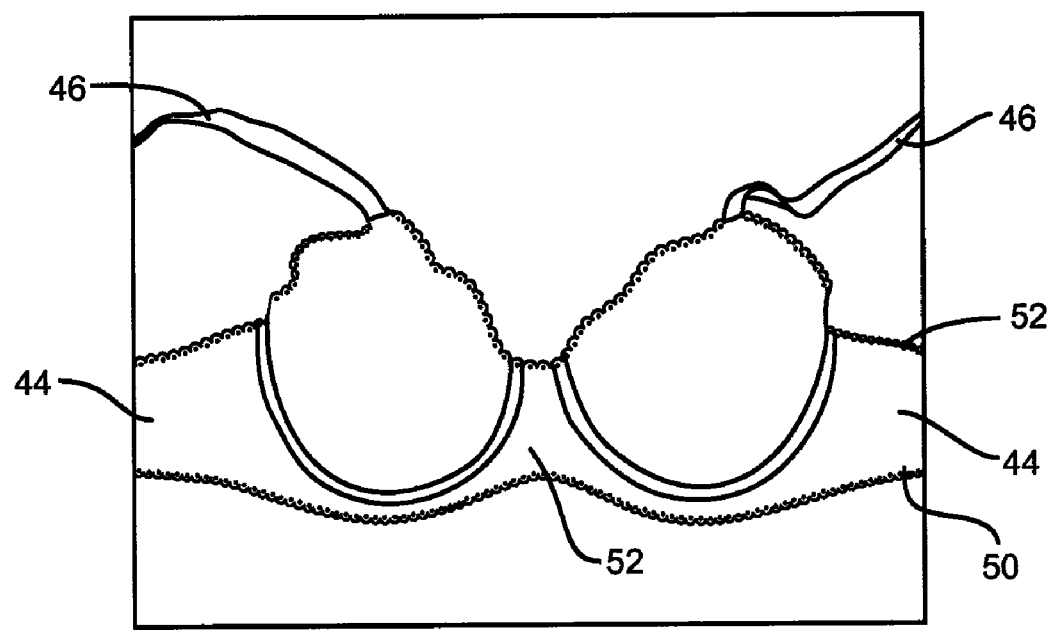
FIG. 8 is another front view of the one piece garment of FIG. 7.

A one-piece brassiere 40 and an exemplary embodiment of a molding step 16 for making the same are shown and described with simultaneous reference to FIGS. 6 through 8.

In the method 10 of FIG. 6, top mold 18 includes a pair of cores 22, while bottom mold 20 includes a pair of cavities 24. Brassiere 40 shown in FIGS. 7 and 8 includes an outer periphery 50 shaped to provide the outer edge of the brassiere. Outer periphery 50 can be cut in non-woven fabric 26 before, during, or after exposure to molding step 16.

Advantageously, outer periphery 50 of non-woven fabric 26 resists fray or roll as is common with woven and/or knit fabrics. Accordingly, non-woven fabric 26 does not require trim along outer periphery 50. Rather, outer periphery 50 itself can form a finished edge 52 of brassiere 40. In the illustrated embodiment, finished edge 52 includes a decorative pattern 54 defined therein, where the decorative pattern also resists fraying and/or rolling.

It should be recognized that brassiere 40 and/or cups 42 are described above by way of example as a single layer. Of course, it is contemplated by the present invention for brassiere 40 and/or cups 42 to have multiple layers. In some embodiments, the multiple layers of brassiere 40 and/or cups 42 can be adhered to one another before, during, or after molding step 16. In a preferred embodiment of the present invention, the multiple layers of brassiere 40 and/or cups 42 are adhered to one another during molding step 16. For example, multiple layers of brassiere 40 and/or cups 42 can be adhered to one another in accordance with the methods provided in U.S. application Ser. No. 10/878,090 filed on Jun. 28, 2004, assigned to the assignee of the present application, the contents of which are incorporated in their entirety by reference herein.

It is contemplated by the present invention for the multiple layers of brassiere 40 to include the non-woven fabric in addition to one or more of a foam material, a woven fabric, a knit fabric, other non-woven substrate, other non-woven fabrics, or any combinations thereof.

Again, it is contemplated by the present invention for method 10 to provide molded non-woven fabrics that find use in any non-woven fabric application that has a desired hand feel. In the examples disclosed above, the desired hand feel was substantially similar to the hand feel provided by molded woven fabrics and/or knit fabrics for soft fabric applications.

However, it is contemplated by the present invention for method 10 to find use in molding non-woven fabrics for use in other garment and/or non-garment applications. It is also contemplated by the present invention for method 10 to mold non-woven fabrics to a desired hand feel for applications other than use in against-the-skin apparel or soft apparel applications.

Figure 9:
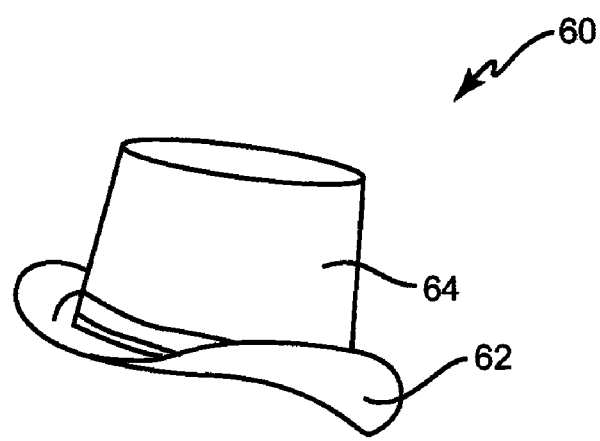
FIG. 9 is a perspective view of another exemplary embodiment of a garment using a molded non-woven fabric.

To illustrate this point, a second embodiment of a garment, more particularly a top hat 60, provided by method 10 is shown in FIG. 9. In this embodiment, method 10 is adjusted to provide a molded non-woven fabric having a hand feel that is substantially similar to that provided by felts having binders disposed therein, namely a hand feel that is soft but provides the hat with a stiff, non-conforming shape.

Top hat 60 includes a molded brim 62 and a generally cylindrical head-covering portion 64. Advantageously, top hat 60 is formed of non-woven fabric that has been molded to provide the hat with, and maintain its shape when worn, the stiffness having been imparted to the non-woven fabric as a result of fabric selection step 12 and molding step 16 and, preferably, without the addition of binders.

During use of method 10 in the manufacture of top hat 60, fabric selection step 12 selects a non-woven fabric. Again, the non-woven fabric selected during step 12 can be produced using a non-woven process such as, but not limited to, a melt-blowing process, a spun-bonding process, a hydroentanglement process, a carding process, or any combinations thereof.

After the desired non-woven fabric is selected at selection step 12, the fabric is again exposed to a washing step 14. Preferably, washing step 14 exposes the desired non-woven fabric to mechanical agitation, preferably in the presence of a wetting agent such as, but not limited to, water. In the example of top hat 60, washing step 14 does not include a fabric softener. It has been determined that the inclusion of fabric softener, much like the basis weight selection discussed above, is dependent upon the end use of the molded product (e.g., brassiere or top hat). Specifically, it has been determined that the need for, the type, the amount, and the chemistry of the softener, if needed, is dependent upon the end use of the molded product. For example, method 10 used to form softer molded products includes softeners, while the method used to form stiffer less drapable products lacks softeners. Since it is believed that the addition of softeners during washing step 14 adds lubrication to the fibers, it is believed that molded products of increased depth can be achieved by the addition of the softeners.

After washing step 14, the fabric is exposed to a molding step 16. It has been determined that the parameters of molding step 16 are also dependent upon the end use of the molded product (e.g., brassiere or top hat). For example, one or more of the molding temperature, compressive forces, and dwell time can be selected to provide the desired hand feel.

During formation of top hat 60, molding step 16 can have a molding temperature of at least about 200 degrees Fahrenheit (F). Further, molding step 16 can have a dwell time of at least about 5 seconds, preferably between about 30 and 45 seconds.

It is believed that increased molding temperature and/or dwell time provide molded non-woven fabric 26 with a stiffer hand feel, while lower molding temperatures and/or dwell time provide the molded non-woven fabric with a softer hand feel.

As seen above, method 10 can be varied to achieve a range of hand feels from those appropriate for soft fabric applications to those appropriate for stiff fabric applications, and any hand feel in between. It has been determined that the polymers selected by fabric selection step 12 and the process parameters of molding step 16 can be varied to vary the hand feel softness, stiffness, drapability, and molded depth of the resultant molded fabric.

For example, it is contemplated by the present invention for method 10 to provide molded non-woven fabrics that find use in a hat, a cap, an ear muff, an air breathing filter, an eye protection device, an impact protection device such as, but not limited to, a male/female protection cup, an elbow cup, a knee cup, body torso molding, garments such as, but not limited to, a glove, a sock, a hat, a brassiere, a disposable garment, and other fabric applications such as, but not limited to, a car interior covering and a furniture covering.

It should also be noted that the terms "first," "second," "third," "upper," "lower," and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

The invention claimed is:

1. A method of molding a brassiere from a non-woven fabric, comprising:
    selecting a non-woven fabric having a web of fibers having a uniform fiber orientation in all directions;
    conditioning the non-woven fabric in a washing procedure with mechanical agitation with water and with or without detergents, thereby breaking down the bonds between some fibers to facilitate molding the fabric;
    compressing said non-woven fabric between a top mold and a bottom mold with the non-woven fabric at molding temperature of at least about 200 degrees Fahrenheit; and
    maintaining said non-woven fabric between said top and bottom molds for a predetermined dwell time of at least about 5 seconds to define a breast covering portion comprising a pair of breast cups, each cup having a molded depth and a molded diameter in the non-woven fabric.

2. The method of claim 1, wherein conditioning said non-woven fabric with mechanical agitation further comprises adding a wetting agent.

3. The method of claim 2, wherein said wetting agent comprises a fabric softener.

4. The method of claim 1, wherein selecting said non-woven fabric having said web of fibers comprises selecting multicomponent fibers having a blend of a low-melting temperature polymer and a high-melting temperature polymer.

5. The method of claim 1, wherein said molding temperature is between about 320 and 360 degrees Fahrenheit.

6. The method of claim 1, wherein said predetermined dwell time is between about 8 and 18 seconds.

7. The method of claim 1, further comprising selecting said top and bottom molds to impart said molded depth to greater than 1 inch.

8. The method of claim 7, wherein said molded depth is between about 2 and 10 inches.

9. The method of claim 1, further comprising applying a wetting agent to at least one of the non-woven fabric, the top mold, and the bottom mold, prior to compressing the non-woven fabric between said top and bottom molds.

10. A method of molding a brassiere from a non-woven fabric, comprising:
    selecting a non-woven fabric having a web of fibers having a uniform fiber orientation in all directions;
    selecting a top mold and a bottom mold to impart a molded depth and a molded diameter to the non-woven fabric, said top and bottom molds having a depth that is larger than said molded depth by about 30 to about 50 percent and a diameter that is larger than said molded diameter by less than about 10 percent;
    compressing said non-woven fabric between said top and bottom molds with the non-woven fabric at a molding temperature of at least about 200 degrees Fahrenheit to form a breast covering portion comprising a pair of breast cups; and
    maintaining said non-woven fabric between said top and bottom molds for a predetermined dwell time of at least about 5 seconds.

11. The method of claim 10, further comprising conditioning said non-woven fabric in a washing procedure with mechanical agitation with water and with or without detergents, thereby breaking down the bonds between some fibers before compressing said non-woven fabric between said top and bottom molds.

12. The method of claim 11, wherein conditioning said non-woven fabric with mechanical agitation further comprises adding a wetting agent.

13. The method of claim 12, further comprising applying a wetting agent to at least one of said non-woven fabric, said top mold and said bottom mold prior to compressing said non-woven fabric between said top and bottom molds.

14. The method of claim 10, wherein said web of fibers are bonded to and/or entangled with one another.

* * * * *